Patented June 16, 1931

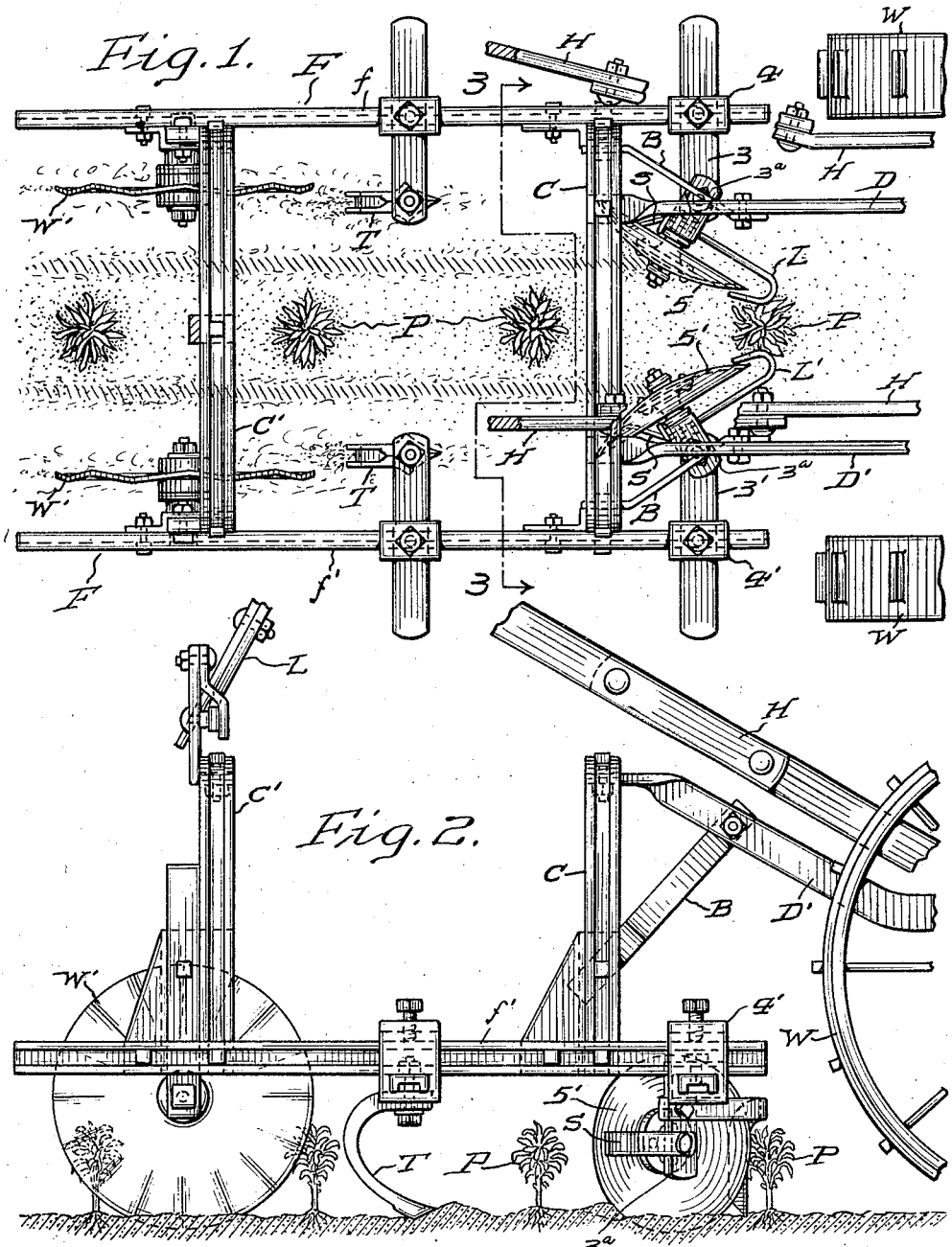

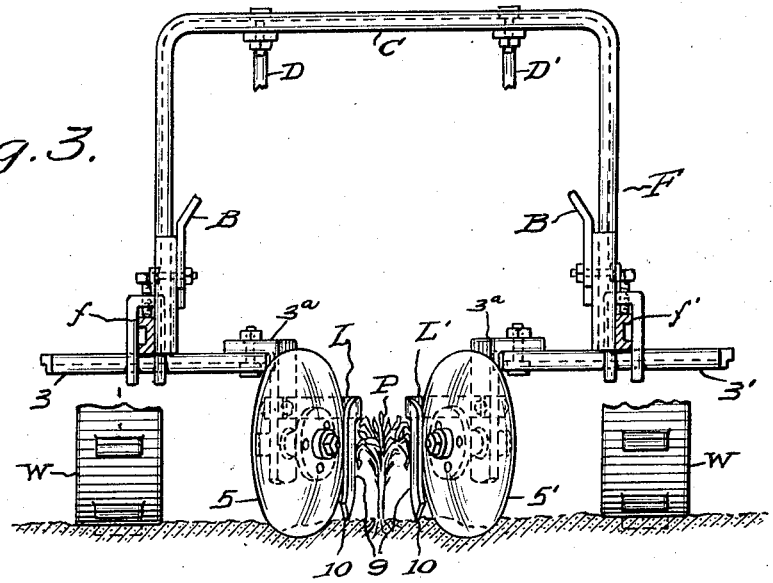
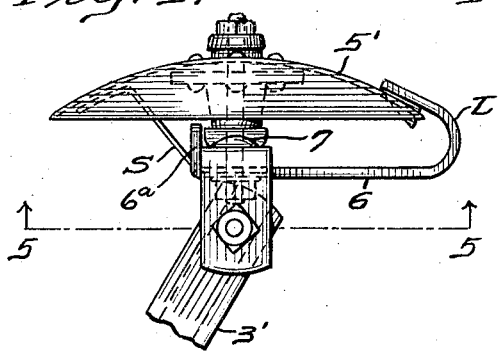
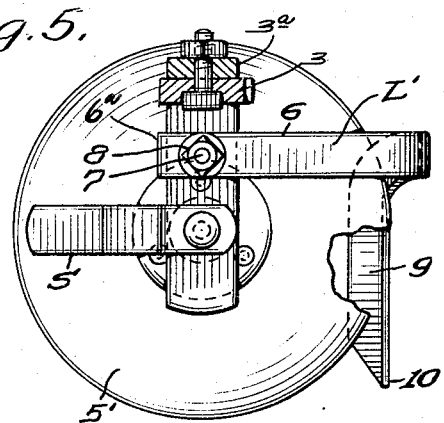

1,810,052

UNITED STATES PATENT OFFICE

JOSEPH MADER, OF PHILADELPHIA, PENNSYLVANIA, ASSIGNOR TO S. L. ALLEN & CO., INC., OF PHILADELPHIA, PENNSYLVANIA, A CORPORATION OF PENNSYLVANIA

LEAF GUARD FOR DISK CULTIVATORS

Application filed October 16, 1930. Serial No. 489,037.

My invention relates to leaf guards of a novel form adapted particularly for employment in association with disk cultivators and operative to prevent damage to plants while being cultivated thereby through cutting of their leaves by the sharpened edges of the disks.

As is well known in the art, disk cultivators are usually employed for breaking up the surface of the earth, particularly near the roots of young growing plants, and when so utilized are usually drawn along the rows of plants by a tractor or other suitable means, the axis of rotation of the disks being oblique to the line of travel of the cultivator and a relatively small portion of the lower edge of each disk penetrating slightly below the surface of the soil.

When young plants, and especially those having foliage of spreading habits, are cultivated in this manner the plants are often cut or damaged by the disks unless some means are provided for preventing contact of the leaves with the edges of the disks, since it is necessary for proper growth of the plants that the soil be cultivated as closely thereto as possible.

While certain forms of leaf guards have heretofore been devised for preventing damage to rather large plants and vines from the passage of a cultivator along the rows, I am aware of no form of leaf guard which is satisfactorily operative to protect relatively small or young plants which are, for the best results, required to be cultivated to within an inch or two on either side of their main stems.

A principal object of my invention is, therefore, to provide a leaf guard adapted for association with a disk cultivator which will enable the disks to be so adjusted as to cultivate the soil relatively close to small plants without danger of damage to the latter through being cut by the disks.

A further object of my invention is to provide a leaf guard of the character aforesaid which may be easily and quickly attached to disk cultivators of the types commonly in use without necessitating any structural changes therein, and which may be readily detached from the cultivator when not required.

A still further object of my invention is to provide a leaf guard which may be manufactured easily and inexpensively and which may thus be supplied as a standard attachment with disk cultivators by manufacturers thereof without greatly increasing the cost of production of the cultivator as a whole.

Other purposes, objects and advantages of my invention will appear from the following description of a preferred embodiment thereof, reference being had to the accompanying drawings.

In the said drawings Fig. 1 is a fragmentary top plan view of certain portions of a disk cultivator of a usual form to which a pair of leaf guards of my invention have been attached for removing the leaves of the plants from the paths of the cultivating disks; Fig. 2 is a fragmentary side elevation of the same; Fig. 3 is a section on the line 3—3 in Fig. 1 in which the cultivating disks and leaf guards are shown in rear elevation; Fig. 4 is a fragmentary enlarged top plan view of a single cultivating disk and its supporting bracket showing the leaf guard of my invention in its normal operative relation thereto, and Fig. 5 is a section on the line 5—5 in Fig. 4 in which the disk is broken away to show a portion of the leaf guard which would otherwise be obscured thereby. In the several figures like characters are used to designate the same parts.

Referring now more particularly to the drawings, it will be understood that while I have shown therein the leaf guards of my invention in association with the frame and certain other parts of a cultivator particularly adapted for employment with a small tractor, that such parts are shown for purposes of illustration only, since the leaf guards of my invention are equally adapted for association with other types of cultivators, the particular form of cultivator utilized constituting no part of the present invention.

Thus, I have shown in Fig. 1 a frame F comprising a pair of parallel longitudinally extending side members $f$, $f'$, secured together by the usual cross members C, C', arched as shown to permit the frame to straddle a row of plants P. Suitable draw bars D, D' are secured to the forward cross member C and extend downwardly and forwardly for attachment to a tractor or other means for drawing the cultivator over the ground, portions of the ground engaging wheels W of the tractor being shown. Braces B are provided to insure rigidity in the connections between the draw bars and the frame, and upwardly and rearwardly extending handle bars H afford means for guiding the tractor along the row of plants, a suitable link L being provided to connect the handle bars to the rear cross member C'. The rear end of the frame is supported on the usual ground engaging wave wheels W' rotatably journaled on suitable brackets secured thereto and disk cultivator brackets 3, 3', desirably provided with L-shaped adjustable end members 3ª, are adjustably secured to the side members f, f' in the usual way by means of clamps 4, 4'. Upon the end members 3ª adjacent the inner ends of the cultivator brackets a pair of oppositely disposed cultivator disks 5, 5' of usual construction are rotatably supported on suitable journals and are so arranged that their forward edges are substantially tangential to the direction of travel of the cultivator as it passes along a row of plants P, the said edges being spaced a suitable distance apart to permit the passage of the plants therebetween and the lower edges of the disks extending a short distance into the ground. In rear of the cultivator disks, and supported on brackets secured to the frame by means of suitable clamps, are the usual harrow teeth T which contribute to the proper cultivation of the soil. Disk scrapers S of a usual form may be attached to the respective disk supporting brackets so as to remove from the inner concave faces of the disks any soil adhering thereto.

For preventing contact of the leaves of the plants P with the edges of the disks 5, 5' I provide, in accordance with my invention, leaf guards generally designated L, L', one of each of which is associated with each disk. Each guard is preferably formed from a single strip of steel or other suitable metal, and comprises a horizontal arm 6 adapted to be secured to the disk supporting bracket adjacent the concave side of the disk by means of a bolt 7 and nut 8 extending outwardly from the bracket in a plane parallel to that of the edge of the disk, the arm at its inner end being turned at right angles to its main portion to provide a lug 6ª adapted to engage the adjacent bracket member 3ª and assist in maintaining the arm 6 in substantially horizontal position when operatively assembled on the bracket member. The strip is also bent backwardly upon itself at approximately its midpoint so as to curve adjacent and around the edge of the disk into substantial parallelism with its convex face, then downwardly substantially at right angles to the arm 6 to thereby form a depending leg 9, which is desirably curved somewhat inwardly so as to substantially follow the contour of the convex face of the disk when the arm 6 is secured to the disk supporting bracket. The lower end of the leg 9 is desirably beveled off to a point as at 10 and is of sufficient length to extend to the surface of the ground or slightly below it when the adjacent disk is disposed in proper operative relationship with the soil.

It will thus be apparent that as the disks move forwardly through the ground, that is, substantially toward the right as viewed in Figs. 1 and 2, the depending legs 9 of my improved leaf guards will be carried along the ground and will push the leaves of the plants inwardly away from the paths of the disks and thus prevent the leaves from being cut or damaged by passage of the disks thereover, while the projection of the points 10 into the soil not only aids the cultivation thereof but also insures engagement of the guards with all the leaves lying in their paths above the surface of the soil and further insures engagement of the leaves by the guards even when the former are lying directly upon, or even partially below the surface of the soil. It will furthermore be apparent that the leaf guards of my invention may be quickly attached to the cultivator with the aid of bolts 7 and nuts 8 and may with equal rapidity be detached therefrom when they are not needed and that they in no way interfere with or obstruct the action of the disks in cultivating the soil and, in fact, really assist therein through the passage of the points 10 therethrough.

While I have herein described with considerable particularity a preferred form of my invention, it will be understood that I do not intend to limit or confine myself thereto as changes and modifications may be made in the design, construction and arrangement thereof without departing from the spirit and scope of the invention as defined in the appended claims.

Having thus described my invention, I claim and desire to protect by Letters Patent of the United States:

1. In combination with a cultivator comprising a cultivating disk and a bracket operative to support said disk, a leaf guard carried by said bracket and having an arm extending horizontally adjacent one face of said disk to a point spaced from the edge thereof, and an integral depending leg disposed adjacent the opposite face of the disk in spaced relation thereto.

2. In combination with a cultivator comprising a rotatable cultivating disk and a bracket operative to support said disk, a leaf guard carried by said bracket and having an arm extending horizontally adjacent one face of said disk to a point spaced from the edge thereof, a curved portion embracing said edge, and an integral depending leg disposed adjacent the opposite face of the disk in spaced relation thereto and substantially equidistant therefrom throughout its length.

3. In combination with a cultivator comprising a dished cultivating disk and a bracket operative to afford support thereto, a leaf guard carried by said bracket and extending horizontally adjacent the concave face of said disk to a point spaced from the edge thereof, a curved portion crossing said edge, and an integral depending leg disposed adjacent the convex face of the disk in spaced relation thereto, the lower extremity of said leg forming a point adapted to operatively engage the soil.

4. A leaf guard for a cultivator disk formed as an integral unit by bending a strip of metal to provide an arm adapted for operative attachment to the disk supporting means to extend adjacent one face of the disk, a reversely curved portion at one end of the arm adapted to overlie the edge of the disk, and a leg at the extremity of the curved portion extending substantially normal to the plane of curvature thereof and adapted to lie in close proximity to the other face of the disk.

5. A leaf guard for a disk cultivator comprising an arm adapted for attachment to the disk supporting means, a lug extending normally to the arm adjacent one end thereof operative to maintain said arm in horizontal position on said means, a curved portion disposed at the other end of said arm and adapted to overlie the edge of the disk, and a vertically depending leg adapted to extend adjacent the convex face of the disk and provided with a ground engaging point at its lower extremity.

In witness whereof I have hereunto set my hand this 15th day of October, 1930.

JOSEPH MADER.